Patented Aug. 26, 1952

2,608,554

UNITED STATES PATENT OFFICE 2,608,554

BASIC CATALYSIS OF THE POLYMERIZATION OF ACRYLONITRILE

Orville Horwitz Bullitt, Jr., Swarthmore, Pa., assignor to E. I. du Pont de Nemours & Company, Wilmington, Del., a corporation of Delaware No Drawing. Application July 3, 1948,
Serial No. 37,059

4 Claims. (Cl. 260—88.7)

This invention relates to a new process for the polymerization of acrylonitrile.

This invention has as an object the provision of a new process for the polymerization of acrylonitrile. A still further object is the provision of a new catalyst for the polymerization of acrylonitrile. Other objects will appear hereinafter.

These objects are accomplished by the following invention wherein acrylonitrile is polymerized by bringing the same in contact at a temperature below 30° C. and above —120° C. in an anhydrous medium substantially non-reactive with acrylonitrile with a catalytic amount, 0.1 to 5% based on the weight of acrylonitrile, of a salt, with an alkali forming metal, of an acid having a $pK_a$ of at least 15 (Hammett, Physical Organic Chemistry, McGraw-Hill, 1940, page 48).

A preferred method of practicing this invention involves the rapid agitation of acrylonitrile with 2-5 volumes of a hydrocarbon such as butane, at a temperature of —90 to —50° C., while a strong base such as lithium diphenylamide is added slowly and carefully in small portions. The strong base may conveniently be added in the form of a solution in a solvent such as diethyl ether. When this process is carried out there is first observed an induction period during which little or no heat is evolved. This is followed by a rapid and exothermic reaction during which strong cooling is required to prevent the polymerization from getting out of control. Addition of the initiator solution is continued at such a rate that the temperature remains in the desired range. When no further heat is evolved on the addition of more strong base the reaction is complete. The polymeric product may be obtained by removal of unused monomer and other ingredients, usually by a combination of the processes of distillation and washing with water. The above process may require from about 0.5 to about 2% of lithium diphenylamide or other strong base, calculated on the weight of acrylonitrile. The procedure may be carried out in a time of from one-half to three hours.

The following examples in which parts are by weight are illustrative of the invention.

Example I

To a vigorously stirred solution of 40 parts of dry acrylonitrile maintained at about 5° C. was added dropwise a saturated solution of sodium methoxide in methanol. After the addition of a few drops of the solution the temperature rose rapidly to 30° C. The reaction mixture was again cooled to 5° C. and a few more drops of the initiator solution added when a similar temperature rise was noted. About 0.5 part of sodium methoxide in about 2 parts of methanol was used in all. A large excess of ethanol and water was then added and the product was separated by filtration, washed in succession with alcohol, 6-N-hydrochloric acid solution, water, ethanol and diethyl ether. In this way six parts of a pale yellow powder was obtained which was soluble in dimethyl formamide to give a solution from which a clear film was obtained on casting by conventional methods. The polymer was insoluble in cyclohexanone and concentrated hydrochloric acid and had a molecular weight of about 4,000 (as determined from viscosity measurements on a 0.1% solution in dimethyl formamide).

Example II

Acrylonitrile (80 parts) was stirred in a nitrogen atmosphere and cooled to —32° C. while one part of methanol saturated with sodium methoxide was added. Little change in temperature occurred for fifteen minutes, at the end of which time 0.5 part of the initiator solution was added which caused the temperature to rise to 0° C. in one minute. At the end of twenty minutes the reaction temperature had again fallen to —32° C. and 0.1 part of initiator solution was added raising the temperature to —17° C. The total time of the reaction was twenty-five minutes, at the end of which the mixture was treated with water and ethanol. The product was separated by filtration and washed with alcoholic hydrogen chloride, ethanol and diethyl ether. There was obtained 19.5 parts of a white powder from which a clear yellow film was obtained by heating at 190° C. under pressure. The molecular weight of the polymer was 17,000. A solution of the polymer in dimethyl formamide yields a clear pale yellow film.

Example III

To a rapidly stirred dispersion of 80 parts of acrylonitrile in 300 parts of butane at —85° C. there was added 15 parts of an ether solution containing 1.5 parts of lithium diphenylamide. The addition of the initiator solution required seventy minutes during which the temperature of the reaction mixture was maintained between —85 and —70° C. At the end of the reaction period the polymeric product was recovered in the manner described in Example II to give 42 parts of a pale green powder having a molecular weight of 78,000.

Example IV

A dispersion of 40 parts of acrylonitrile in 100 parts of butane was stirred rapidly while 7 parts of an ether solution containing 0.7 part of phenyllithium was added during twenty minutes. The temperature was maintained between −68 and −72° C. When the product was isolated as described in Example II a total of 3.5 parts of a pale yellow powder having a molecular weight of 23,000 was obtained.

*Example V*

To about 1.4 parts of potassium amide in 572 parts of liquid ammonia in a 3-necked round bottom flask protected from moisture by a drying tube was added slowly with stirring, 130 parts of distilled acrylonitrile. A vigorous reaction occurred leaving a light yellow solid in the flask. Ammonium chloride was added to the mixture and excess water cautiously added to the flask. The solid was filtered, washed with water and finally with acetone. A 93% yield of polyacrylonitrile was obtained, light yellow in color with a molecular weight of 22,000.

If the mode of addition of monomer to base is reversed (potassium amide in liquid ammonia added to a liquid ammonia solution of acrylonitrile) polymerization still occurred although the quantity of base in this case was extremely small. Only catalytic amounts are required.

In the process of this invention there is employed as the initiator for the polymerization of acrylonitrile the salt, with an alkali forming metal, of an acid having a $pK_a$ of at least 15 (Hammett, pages 49–50) and generally less than 75, including not only the compounds listed in Hammett but also all such compounds so defined.

The preferred initiators are the group IA metal salts of such acids which include particularly the alkali metal alkoxides, aryls, and amides, for example, sodium methoxide, potassium methoxide, sodium ethoxide, sodium tertiary butoxide, phenyllithium, lithium ethylphenylamide, potassium amide, lithium diphenylamide, and indenyllithium. Other initiators include the salts, with alkali forming metals, i. e., group IA and IIA metals, of alkanes, aralkanes, nitriles, etc.

The strong bases used as initiators in this invention may be prepared in a variety of ways which are well described in the literature. One method of preparation of a base involves the synthesis of phenyllithium from bromobenzene and lithium metal as described by Gilman, J. Am. Chem. Soc. 54, 1957 (1932). The phenyllithium made in this way is obtained in ether solution which is suitable for use directly in the practice of this invention. By the addition of suitable amounts of acids stronger than benzene to this ether solution, a large number of initiator solutions may readily be prepared in a convenient form.

The temperature of the polymerization should be less than 30° C. and usually between 30° and −120° C. with a preferred range of from −50° to −90° C. The polymerization may be run in bulk, or inert solvents or diluents such as ether, toluene, butane, or pentane may be employed. Since initiators which are particularly effective in the practice of this invention are readily decomposed by water and other active hydrogen-containing materials, the presence of these substances in other than small amounts is to be avoided, particularly if high molecular weight products are desired, i. e., the polymerization is conducted essentially in the absence of more than 10%, based on acrylonitrile, of active hydrogen containing materials which have a $pK_a$ of 30 to 15 and in the substantial absence of any material having a $pK_a$ less than that of the conjugate acid of the basic catalyst. If methanol or other alcohol is used as solvent for the initiator its concentration should be kept at a minimum, preferably below 10% based on the acrylonitrile. When the reaction temperature is maintained at 30° C. or below, in addition to acrylonitrile, amounts of less than 50% of other vinyl compounds such as nitroethylene may be present during polymerization.

Depending upon the precise conditions employed within the scope of this invention acrylonitrile polymers ranging in degree of polymerization from about 50 to about 5000 monomer units per polymer molecule can be obtained. They are useful for the manufacture of films, fibers, and plastics articles.

The foregoing detailed description has been given for clearness of understanding only and no unnecessary limitations are to be understood therefrom. The invention is not limited to the exact details shown and described, since obvious modifications will occur to those skilled in the art.

What is claimed is:

1. A process for the polymerization of acrylonitrile wherein acrylonitrile is brought in contact at a temperature between −50° C. and −90° C. with the salt, with an alkali forming metal, of an acid having a $pK_a$ of 15–75 in an anhydrous medium inert to acrylonitrile and of $pK_a$ at least equal to that of said acid.

2. Process of claim 1 wherein the conjugate base is a group IA metal salt of such an acid.

3. A process for the polymerization of acrylonitrile wherein acrylonitrile is brought in contact at −50 to −90° C. in an anhydrous liquid hydrocarbon solvent therefor with a group IA metal salt of an acid having a $pK_a$ of 15–75.

4. A process for the polymerization of acrylonitrile wherein acrylonitrile is brought in contact at −50 to −90° C. in butane with a group IA metal salt of an acid having a $pK_a$ of 15–75.

ORVILLE HORWITZ BULLITT, Jr.

REFERENCES CITED

The following references are of record in the file of this patent:

UNITED STATES PATENTS

| Number | Name | Date |
|---|---|---|
| 2,458,355 | Dickey | Jan. 4, 1949 |
| 2,467,234 | Sargent | Apr. 12, 1949 |
| 2,475,424 | Dickey et al. | July 5, 1949 |

OTHER REFERENCES

Glasstone—Textbook of Physical Chemistry—2nd Ed., pages 974–975.

Wooster, 56 J. Am. Chem Soc. 1134–1136, May 1934.